(12) United States Patent
Xi et al.

(10) Patent No.: US 8,743,325 B2
(45) Date of Patent: Jun. 3, 2014

(54) LIQUID CRYSTAL DISPLAY PANEL

(75) Inventors: Peng-Bo Xi, Hsin-Chu (TW);
Shin-Hung Yeh, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 708 days.

(21) Appl. No.: 13/015,565

(22) Filed: Jan. 27, 2011

(65) Prior Publication Data

US 2012/0026446 A1 Feb. 2, 2012

(30) Foreign Application Priority Data

Jul. 29, 2010 (TW) ................................ 99125131 A

(51) Int. Cl.
*G02F 1/1335* (2006.01)

(52) U.S. Cl.
USPC ............................................ 349/114; 349/39

(58) Field of Classification Search
USPC ................................................... 349/114, 39
See application file for complete search history.

(56) References Cited

U.S. PATENT DOCUMENTS

| 7,623,190 B2 | 11/2009 | Kim | |
|---|---|---|---|
| 2009/0128757 A1* | 5/2009 | Koshihara et al. | 349/114 |
| 2009/0273570 A1* | 11/2009 | Degner et al. | 345/173 |

* cited by examiner

*Primary Examiner* — Eric Wong
(74) *Attorney, Agent, or Firm* — Winston Hsu; Scott Margo

(57) ABSTRACT

A liquid crystal display panel includes a first substrate, a second substrate, a liquid crystal layer disposed between the first substrate and the second substrate, a common electrode layer disposed on the first substrate and a plurality of pixel structures disposed on the second substrate. Each of the pixel structure includes a first data line, a second data line, a third data line and at least a capacitance adjusting layer. The capacitance adjusting layer is disposed between the common electrode layer and the second data line.

30 Claims, 13 Drawing Sheets

LIQUID CRYSTAL DISPLAY PANEL

BACKGROUND OF THE INVENTION

1. Field of the Invention

The present invention relates to a liquid crystal display panel, and more particularly, to a liquid crystal display panel, in which a coupling capacitor coupled between a data line electrically connected to a green sub-pixel and a common electrode disposed on a color filter substrate is larger than a coupling capacitor coupled between a data line electrically connected to a red sub-pixel or a blue sub-pixel and the common electrode disposed on the color filter substrate.

2. Description of the Prior Art

Generally, liquid crystal display panels have several advantages, such as light weight, low power consumption, low radiation, etc., and therefore, the liquid crystal display panels have been widely applied to various portable electronic products in the market, such as notebooks and personal digital assistants (PDAs), etc. However, when the liquid crystal display panel is driven, liquid crystal molecules may have permanent deformation due to the liquid crystal molecules being fixed at an angle for a long time. As a result, the liquid crystal display panel cannot refresh frames. Accordingly, in order to avoid reducing display qualities, several polarity inversion driving methods have been applied to drive the liquid crystal display panels.

The polarity inversion driving methods can be classified as frame inversion, row inversion, column inversion and dot inversion, etc. Please refer to FIG. 1, which schematically illustrates a polarity arrangement of sub-pixels when a liquid crystal display panel displays a test pattern by using a column inversion driving method according to the prior art. As shown in FIG. 1, the liquid crystal display panel 10 of the prior art includes a plurality of sub-pixels 12 arranged in a matrix. The sub-pixels 12 disposed in the same column are the sub-pixels used to display red, green and blue in sequence and accordingly denoted by red sub-pixels 12, green sub-pixels 12, and blue sub-pixels 12. Also, a red sub-pixel 12, a green sub-pixel 12 adjacent to the red sub-pixel, and a blue sub-pixel 12 adjacent to the green sub-pixel constitute a single pixel 18. When the liquid crystal display panel 10 is driven by the column inversion driving method, the polarities of the sub-pixels 12 disposed in the same row are alternately arranged with the positive polarity 14 and the negative polarity 16, and the sub-pixels 12 disposed in the same column have the same polarity.

Moreover, when a liquid crystal display panel is tested by displaying a test pattern, the pixels 18 disposed in the same row alternatively display bright and dark, and the pixels 18 disposed in the same column also alternatively display bright and dark. In accordance with the column inversion driving method, the red sub-pixels 12 and the blue sub-pixels 12 that are turned on and disposed in the first row have a positive polarity, and the green sub-pixels 12 that are turned on and disposed in the first row have a negative polarity; on the contrary, the red sub-pixels 12 and the blue sub-pixels 12 that are turned on and disposed in the second row have the negative polarity, and the green sub-pixels 12 that are turned on and disposed in the second row have the positive polarity. The polarities of the sub-pixels 12 are determined by the pixel voltage of each of the sub-pixels 12 being compared to a common voltage. When the pixel voltage is larger than the common voltage, the sub-pixel 12 has the positive polarity, and the pixel electrode is kept at a high voltage level; on the contrary, when the pixel voltage is smaller than the common voltage, the sub-pixel 12 has the negative polarity, and the pixel electrode is kept at a low voltage level.

Please refer to FIG. 2, which illustrates waveforms of a pixel voltage of the red sub-pixel/the blue sub-pixel and another pixel voltage of the green sub-pixel disposed in the first row as shown in FIG. 1. As shown in FIG. 1 and FIG. 2, a number of the sub-pixels 12 having the positive polarity 14 is larger than a number of the other sub-pixels 12 having the negative polarity 16 in the same row; that is data signals Vd provided to the red sub-pixels 12 and the blue sub-pixels 12 are kept at the high voltage level, and data signals Vd provided to the green sub-pixels 12 are kept at the low voltage level. Under this condition, the common voltage Vcom may be affected by the data signals Vd provided to the red sub-pixels 12 and the blue sub-pixels 12, and shift toward the high voltage level. Thus, a pixel voltage difference for driving the red sub-pixels 12/the blue sub-pixels 12 is reduced, and a pixel voltage difference for driving the green sub-pixels 12 is raised. Consequently, the red sub-pixels 12 and the blue sub-pixels 12 display low gray scales, and the green sub-pixels 12 display high gray scales. As a result, when the liquid crystal display panel 10 is tested to display the test pattern by using the column inversion driving method, the liquid crystal display panel 10 may display greenish frames. Accordingly, to solve the greenish problem of frames is an objective in industry.

SUMMARY OF THE INVENTION

It is therefore one of the objectives of the present invention to provide a liquid crystal display panel to solve the greenish problem of frames.

According to an embodiment of the present invention, the present invention provides a liquid crystal display panel, having a plurality of pixel areas, and each of the pixel areas includes a first sub-pixel area, a second sub-pixel area and a third sub-pixel area. The second sub-pixel area is disposed between the first sub-pixel area and the third sub-pixel area. The liquid crystal display panel includes a first substrate, a second substrate, a liquid crystal layer, a common electrode layer and a plurality of pixel structures. The second substrate is disposed opposite to first substrate. The liquid crystal layer is disposed between the first substrate and the second substrate, and the liquid crystal layer has a first dielectric constant. The common electrode layer is disposed on the first substrate. Each of the pixel structures is respectively disposed in each of the pixel areas, and each of the pixel structures includes a first data line, a second data line, a third data line, at least a first sub-pixel, at least a second sub-pixel, at least a third sub-pixel and at least a first capacitance adjusting layer. The first data line, the second data line and the third data line are disposed on the second substrate, and are respectively located at a side of the first sub-pixel area, the second sub-pixel area and the third sub-pixel area. The first sub-pixel is disposed on the second substrate in the first sub-pixel area and electrically connected to the first data line. The second sub-pixel is disposed on the second substrate in the second sub-pixel area and electrically connected to the second data line. The third sub-pixel is disposed on the second substrate in the third sub-pixel area and electrically connected to the third data line. The first capacitance adjusting layer is disposed between the common electrode layer and the second data line, and the first capacitance adjusting layer has a second dielectric constant, and the second dielectric constant is larger than the first dielectric constant.

According to another embodiment of the present invention, the present invention further provides a liquid crystal display panel, having a plurality of pixel areas, and each of the pixel areas includes a first pixel area, a second pixel area and a third pixel area, and the second pixel area is disposed between the first pixel area and the third pixel area. The liquid crystal display panel includes a first substrate, a second substrate, a liquid crystal layer, a common electrode layer and a plurality of pixel structures. The second substrate is disposed opposite to the first substrate. The liquid crystal layer is disposed between the first substrate and the second substrate, and the liquid crystal layer has a first dielectric constant. The common electrode layer is disposed on the first substrate. Each of the pixel structures is respectively disposed in each of the pixel areas, and each of the pixel structures includes a first data line, a second data line, a third data line, at least a first sub-pixel, at least a second sub-pixel, at least a third sub-pixel and at least two second capacitance adjusting layers. The first data line, the second data line, and the third data line are disposed on the second substrate and respectively located at a side of the first sub-pixel area, the second sub-pixel area, and the third sub-pixel area. The first sub-pixel is disposed on the second substrate in the first sub-pixel area and electrically connected to the first data line. The second sub-pixel is disposed on the second substrate in the second sub-pixel area and electrically connected to the second data line. The third sub-pixel is disposed on the second substrate in the third sub-pixel area and electrically connected to the third data line. The second capacitance adjusting layers are respectively disposed between the common electrode layer and the first data line and between the common electrode layer and the third data line. Also, each of the second capacitance adjusting layers has a third dielectric constant, and the third dielectric constant is smaller than the first dielectric constant.

In the present invention, the first capacitance adjusting layer, disposed between the common electrode layer and the second data line, or the second capacitance adjusting layers, disposed between the common electrode layer and the first data line and between the common electrode layer the third data line respectively, could be utilized to substantially equalize offsets of the common voltages which respectively shift toward the first polarity and the second polarity of the common electrode layer. As a result, the net common voltage would not vary with the influence of the data signals, and thus the greenish problem of images could be solved.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the presented invention for ones skilled in the art, preferred embodiments will be detailed as follows. The preferred embodiments of the present invention are illustrated in the accompanying drawings with numbered elements to elaborate the contents and effects to be achieved.

Figure 1:
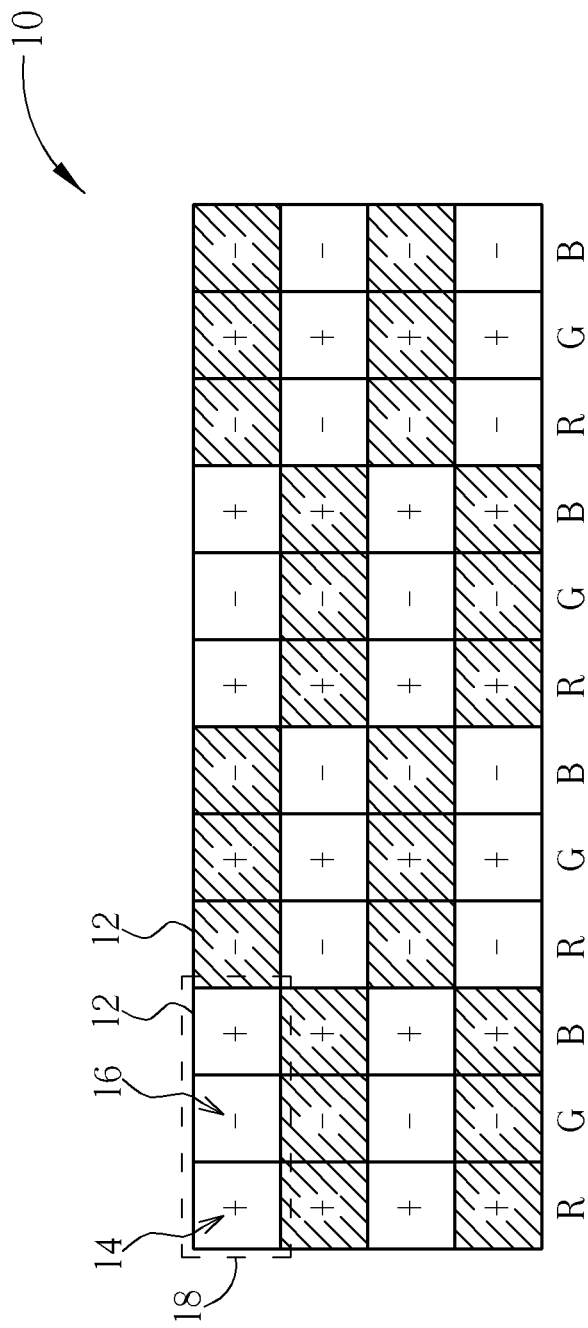
FIG. 1 is a schematic diagram illustrating a polarity arrangement of sub-pixels when a liquid crystal display panel displays a test pattern by using a column inversion driving method according to the prior art.
Figure 2:
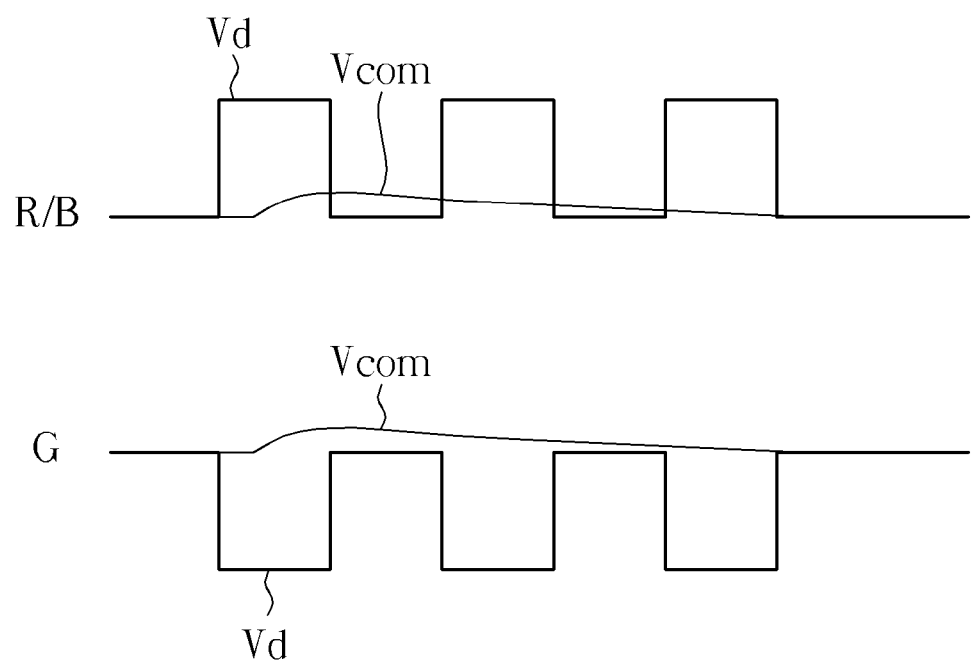
FIG. 2 is a schematic diagram respectively illustrating waveforms of a pixel electrode voltage of the red sub-pixel/the blue sub-pixel and another pixel electrode voltage of the green sub-pixel being disposed on the first row as shown in FIG. 1.
Figure 3:
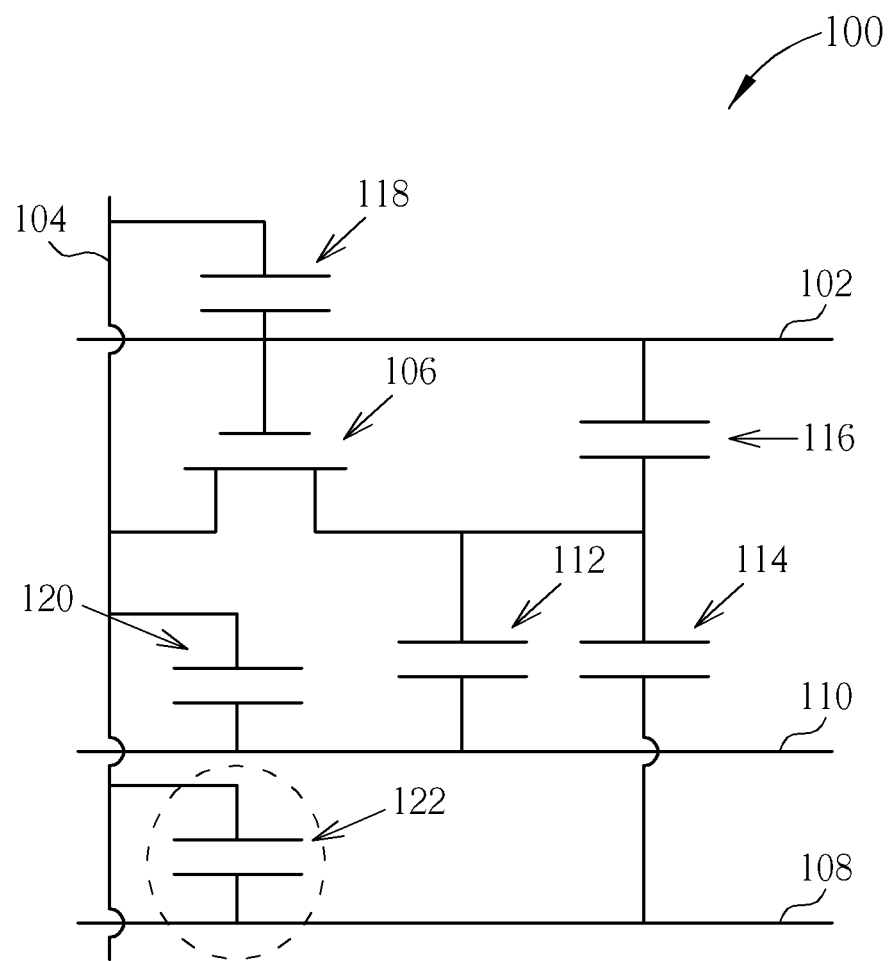
FIG. 3 is a schematic diagram illustrating an equivalent circuit of a sub-pixel of the present invention.

Please refer to FIG. 3, which schematically illustrates an equivalent circuit of a sub-pixel according to the present invention. As shown in FIG. 3, the sub-pixel 100 of the present invention is electrically connected to a scan line 102 and a data line 104, and the sub-pixel 100 includes a transistor 106 and a pixel electrode (not shown in FIG. 3). The pixel electrode is electrically connected to a source electrode of the transistor 106, and a drain electrode of the transistor 106 is electrically connected to the data line 104, and the gate electrode of the transistor 106 is electrically connected to the scan line 102. Also, the pixel electrode overlaps the common electrode 108 and a common line 110, so that a storage capacitor 112 is coupled between the pixel electrode and the common line 110, and a liquid crystal capacitor 114 is coupled between the pixel electrode and the common electrode 108. The data line 104, the scan line 102, the common line 110 and the transistor 106 are disposed on a pixel array substrate, and the common electrode 108 is disposed on a color filter substrate. Moreover, a coupling capacitor 116 is coupled between the source electrode of the transistor 106 and the scan line 102, and a coupling capacitor 118 is coupled between the data line 104 and the scan line 102. Additionally, a coupling capacitor 120 is coupled between the data line 104 and the common line 110 on the pixel array substrate, and a coupling capacitor 122 is coupled between the data line 104 and the common electrode 108 on the color filter substrate. Accordingly, when the transistor 106 is turned on by a scan signal, a data signal would be transmitted to the pixel electrode through the transistor 106. Meanwhile, other coupling capacitors are coupled between the data line 104 and the common line 110 and between the data line 104 and the common electrode 108 respectively; that is the coupling capacitor 120 between the data line 104 and the common line 110 on the pixel array substrate, the coupling capacitor 122 between the data line 104 and the common electrode 108 on the color filter substrate, the storage capacitor 112, and the liquid crystal capacitor 114. Thus, the voltages on the common line 110 and the common electrode 108 are affected by the data signal to shift.

To improve the greenish problem of frames due to the unbalance of the polarities, the present invention adjusts the capacitance of the coupling capacitor 122, and therefore the red sub-pixel, the green sub-pixel, and the blue sub-pixel in a single pixel area can be electrically connected to different coupling capacitors 122 with different capacitances on condition that the storage capacitor 112, the data line-common line capacitor 120, and the liquid crystal capacitor 114 remain unchanged in each of the sub-pixels. Accordingly, the red sub-pixel, the green sub-pixel, and the blue sub-pixel have the same pixel voltage, and thus to solve the greenish problem of frames.

Figure 4:
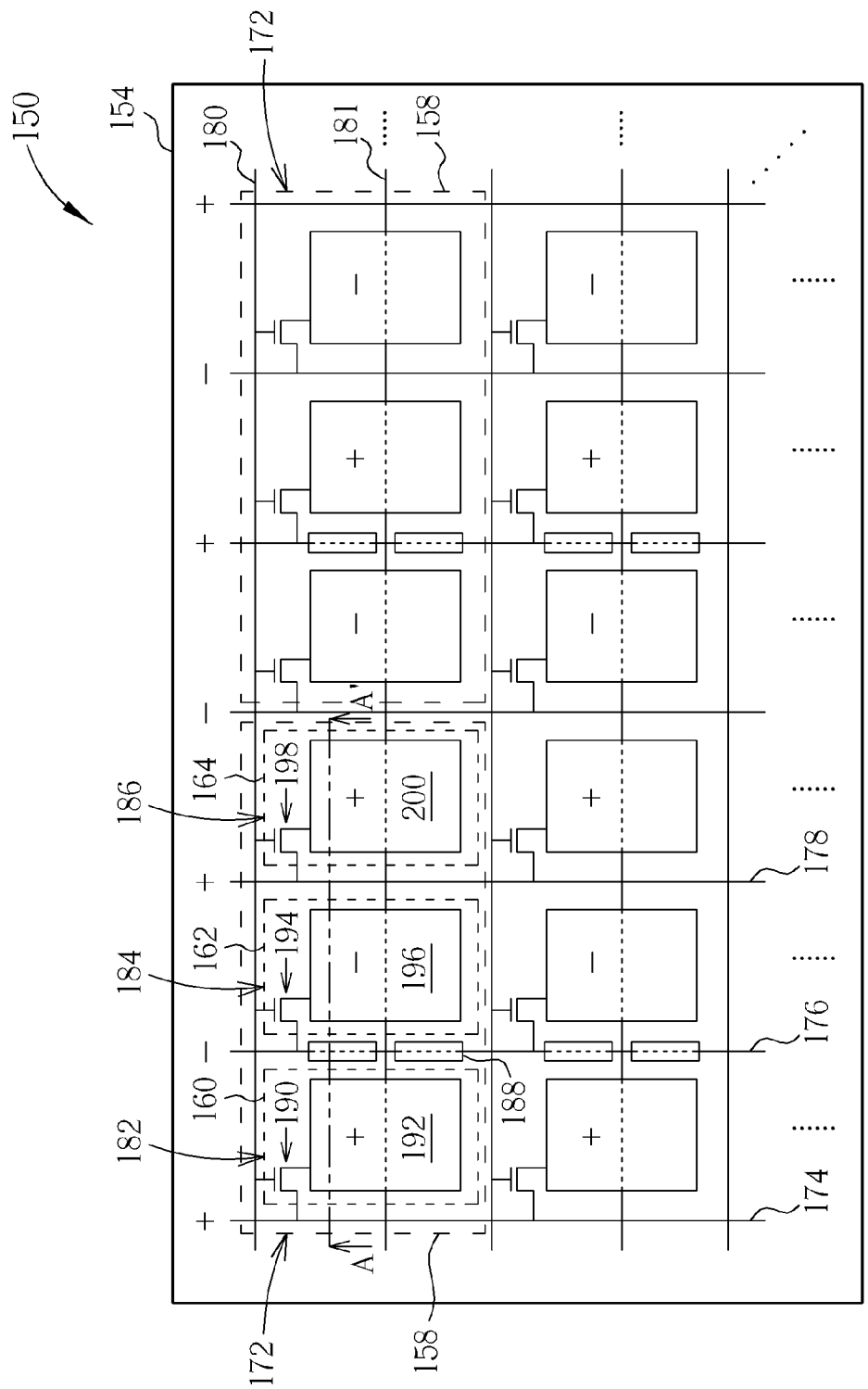
FIG. 4 is a schematic diagram illustrating a top view of a liquid crystal display panel according to a first preferred embodiment of the present invention.
Figure 5:
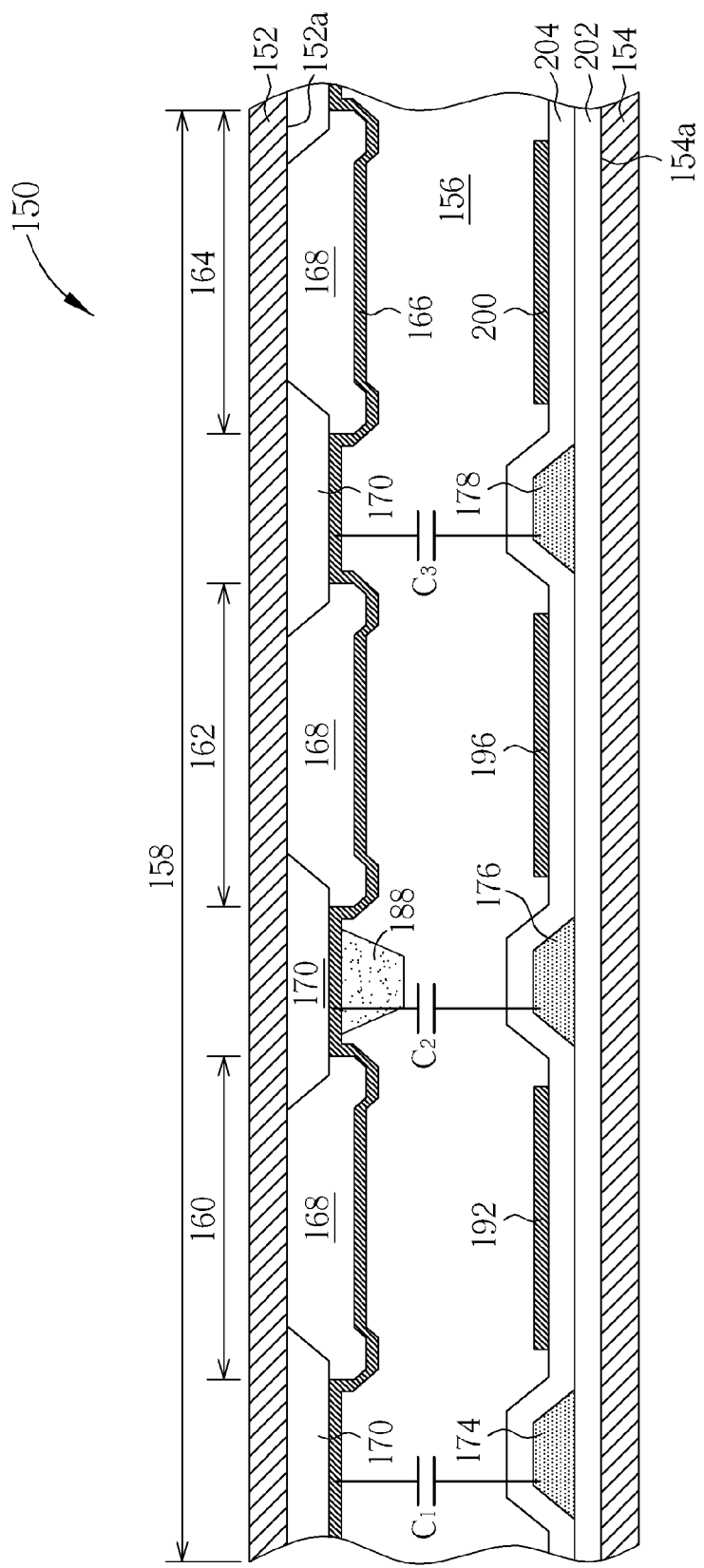
FIG. 5 is a schematic diagram illustrating a cross-sectional view of the liquid crystal display panel along a cutting line AA' shown in FIG. 4

Please refer to FIG. 4 and FIG. 5. FIG. 4 is a schematic diagram illustrating a top view of a liquid crystal display panel according to a first preferred embodiment of the present invention, and FIG. 5 is a schematic diagram illustrating a cross-sectional view of the liquid crystal display panel along a cutting line AA' shown in FIG. 4 according to the first preferred embodiment. As shown in FIG. 4 and FIG. 5, the liquid crystal display panel 150 includes a first substrate 152, a second substrate 154, and a liquid crystal layer 156. The first substrate 152 is a transparent substrate, such as a glass substrate or a plastic substrate, etc., used for fabricating the color filter substrate, and the first substrate 152 has a first surface 152a. The second substrate 154 and the first substrate 152 are disposed in parallel and opposite to each other, and the second substrate 154 has a second surface 154a opposite to the first surface 152a. The second substrate 154 is a transparent substrate, such as a glass substrate or a plastic substrate, etc., used for fabricating the thin film transistor substrate. The liquid crystal layer 156 is disposed between the first substrate 152 and the second substrate 154, and the liquid crystal layer 156 has a first dielectric constant, substantially between 3.5 and 7.

The liquid crystal display panel 150 has a plurality of pixel areas 158, and each of the pixel areas 158 includes a first sub-pixel area 160, a second sub-pixel area 162, and a third sub-pixel area 164, and the second sub-pixel area 162 is disposed between the first sub-pixel area 160 and the third sub-pixel area 164. In addition, the liquid crystal display panel 150 further includes a common electrode layer 166, a plurality of color filter layers 168, and a black matrix layer 170, disposed on the first surface 152a of the first substrate 152. The common electrode layer 166 is disposed between the first substrate 152 and the liquid crystal layer 156, and the common electrode layer 166 can be composed of a transparent conductive material, such as Indium-Zinc-Oxide, Indium-Tin-Oxide, etc. The black matrix layer 170 and the color filter layers 168 are disposed between the common electrode layer 166 and the first substrate 152, and the black matrix layer 170 is disposed between the color filter layers 168. The color filter layers 168 respectively disposed in each of the first sub-pixel areas 160, each of the second sub-pixel areas 162, and each of the third sub-pixel areas 164.

In this preferred embodiment, the color filter layers 168 disposed in each of the pixel areas 158 can be classified as a red color filter layer, a green color filter layer, and a blue color filter layer. Each of the red color filter layers is disposed on the first substrate 152 in each of the first sub-pixel areas 160. Each of the green filter layers is disposed on the first substrate 152 in each of the second sub-pixel areas 162. Each of the blue filter layers is disposed on the first substrate 152 in each of the third sub-pixel areas 164. Thus, the first sub-pixel area 160 can be defined as a red sub-pixel area, the second sub-pixel area 162 can be defined as a green sub-pixel area, and the third sub-pixel area 164 can be defined as a blue sub-pixel area, but not limited thereto.

Moreover, the liquid crystal display panel 150 further includes a plurality of pixel structures 172, and each of the pixel structures 172 is disposed in the each of the pixel areas 158. Also, each of the pixel structures 172 includes a first data line 174, a second data line 176, a third data line 178, a scan line 180, a common line 181, at least a first sub-pixel 182, at least a second sub-pixel 184, at least a third sub-pixel 186, and at least a first capacitance adjusting layer 188. The scan line 180 and the common line 181 are constituted by a first metal layer, and the first data line 174, the second data line 176 and the third data line 178 are constituted by a second metal layer. The first data line 174, the second data line 176 and the third data line 178 are respectively disposed on the second substrate 154 at a side of the first sub-pixel area 160, the second sub-pixel area 162 and the third sub-pixel area 164, and cross the scan line 180 and the common line 181. The common line 181 is located across the first sub-pixel area 160, the second sub-pixel area 162, and the third sub-pixel area 164. The first sub-pixel 182, the second sub-pixel 184, and the third sub-pixel 186 are respectively disposed on the second substrate 154 in the first sub-pixel area 160, the second sub-pixel area 162, and the third sub-pixel area 164. Furthermore, the first sub-pixel 182 includes a first transistor 190 and a first sub-pixel electrode 192. The second sub-pixel 184 includes a second transistor 194 and a second sub-pixel electrode 196, and the third sub-pixel 186 includes a third transistor 198 and a third sub-pixel electrode 200. Additionally, the drain electrodes of the first transistor 190, the second transistor 194, and the third transistor 198 are electrically connected to the first sub-pixel electrode 192, the second sub-pixel electrode 196, and the third sub-pixel electrode 200 respectively, and the source electrodes of the first transistor 190, the second transistor 194, and the third transistor 198 are electrically connected to the first data line 174, the second data line 176 and the third data line 178 respectively. The gate electrodes of the first transistor 190, the second transistor 194 and the third transistor 198 are electrically connected to the scan line 180. In addition, a first coupling capacitor C1 is coupled between the common electrode layer 166 and the first data line 174, and a second coupling capacitor C2 is coupled between the common electrode layer 166 and the second data line 176. A third coupling capacitor C3 is coupled between the common electrode layer 166 and the third data line 178. The first capacitance adjusting layer 188 disposed between the common electrode layer 166 and the second data line 176 is used to adjust the capacitance of the second coupling capacitor C2. The first capacitance adjusting layer 188 in the present invention has a second dielectric constant, and the second dielectric constant is larger than the first dielectric constant of the liquid crystal layer 156. Moreover, the first capacitance adjusting layer 188 can be composed of a material with a high dielectric constant, such as Silicon Nitride (SiNx), silicon oxynitride with high nitrogen contents, or Tantalum pentoxide ($Ta_2O_5$), etc., but not limited thereto.

Furthermore, each of the pixel structures 172 further includes an insulating layer 202 and a passivation layer 204. The insulating layer 202 is disposed between the first metal layer and the second metal layer for electrically insulating the first metal layer and the second metal layer. The passivation layer 204 is disposed between the second metal layer and the liquid crystal layer 156 for protecting electronic devices and circuits disposed on the second substrate 154. In this preferred embodiment, the first capacitance adjusting layer 188 can be disposed between the common electrode layer 166 and the liquid crystal layer 156; in other words, the first capacitance adjusting layer 188 is fabricated on the first substrate 152. Also, the first capacitance adjusting layer 188 overlaps the second data line 176, so that the liquid crystal layer 156, the passivation layer 204 and the first capacitance adjusting layer 188 constitute a dielectric layer of the second coupling capacitor C2. Additionally, no capacitance adjusting layer is disposed between the first data line 174 and the common electrode layer 166 and between the third data line 178 and the common electrode layer 166. As a result, dielectric layers of the first coupling capacitor C1 and the third coupling capacitor C3 are only composed of the liquid crystal layer 156 and the passivation layer 204. It is noted that the first capacitance adjusting layer 188 has a second dielectric constant, and the second dielectric constant is larger than the first dielectric constant of the liquid crystal layer, and thus a capacitance of the second coupling capacitor C2 is larger than capacitances of the first coupling capacitor C1 and the third coupling capacitor C3.

When the liquid crystal display panel 150 displays frames by the column inversion driving method, the first data line 174 and the second data line 176 transmit the data signals with a first polarity to the first sub-pixel 182 and the third sub-pixel 186 respectively, and thus the first sub-pixel 182 and the third sub-pixel 186 have the first polarity. Meanwhile, the second data line 176 transmits a data signal with the second polarity to the second sub-pixel 184, and thus the second sub-pixel 184 has the second polarity. The first polarity is opposite to the second polarity. In this embodiment, the first polarity is a positive polarity, and the second polarity is a negative polarity, but not limited thereto, and vice versa. During the displaying step, the data signal with the second polarity transmitted by the second data line 176 induces a coupling effect to a common voltage of the common electrode layer 166, so that the common voltage shifts toward the second polarity. Also, the data signals with the first polarity transmitted by the first data line 174 and the third data line 178 induce a coupling effect to the common voltage of the common electrode layer 166, so that the common voltage shift toward the first polarity. It is noted that a total number of the data signals transmitted by the first data line 174 and the third data line 178 and having the first polarity is twice as a total number of the data signals transmitted by the second data line 176 and having the second polarity. However, the second coupling capacitor C2 in this embodiment is designed to be larger than the first coupling capacitor C1 and the third coupling capacitor C3, and therefore the data signals with the second polarity induce a higher coupling effect to the common voltage of the common electrode layer 166 as compared with the data signals with the first polarity. Thus, a deviation of the common voltage of the common electrode layer 166 respectively shifting toward the first polarity and the second polarity can be substantially the same. Since the first polarity is opposite to the second polarity, the deviation of the common voltage respectively shifting toward the first polarity and the second polarity can be canceled out, and thus the common voltage do not vary with the influence of the data signals. As a result, voltage differences between the common electrode layer 166 and the first sub-pixel electrode 192, between the common electrode layer 166 and the second sub-pixel electrode 196 and between the common electrode layer 166 and the third sub-pixel electrode 200 respectively can be substantially the same, and the greenish problem of frames can be consequently solved.

Figure 6:
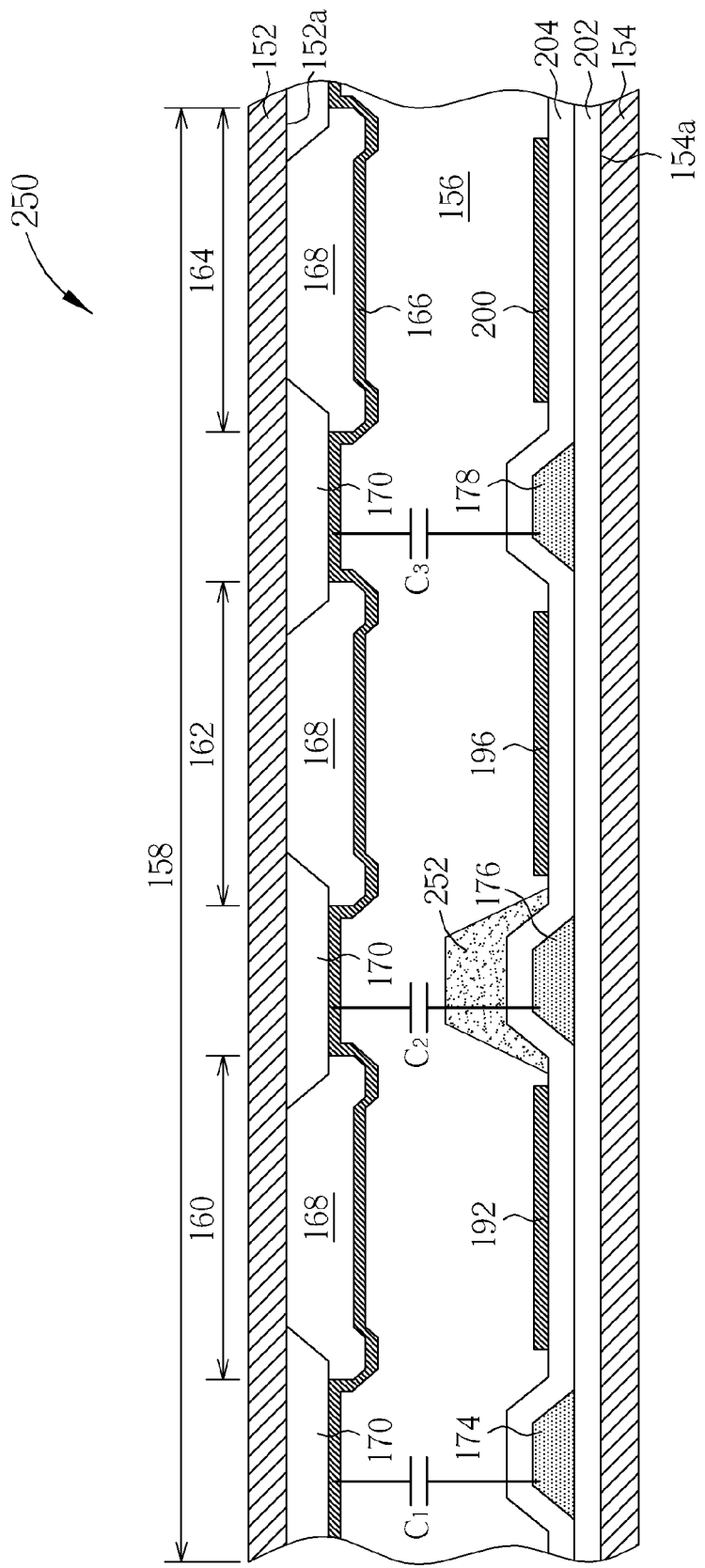
FIG. 6 through FIG. 8 are schematic diagrams illustrating cross-sectional views of liquid crystal display panels along the cutting line AA' shown in FIG. 4 according to a second preferred embodiment to a fourth preferred embodiment of the present invention.
Figure 7:
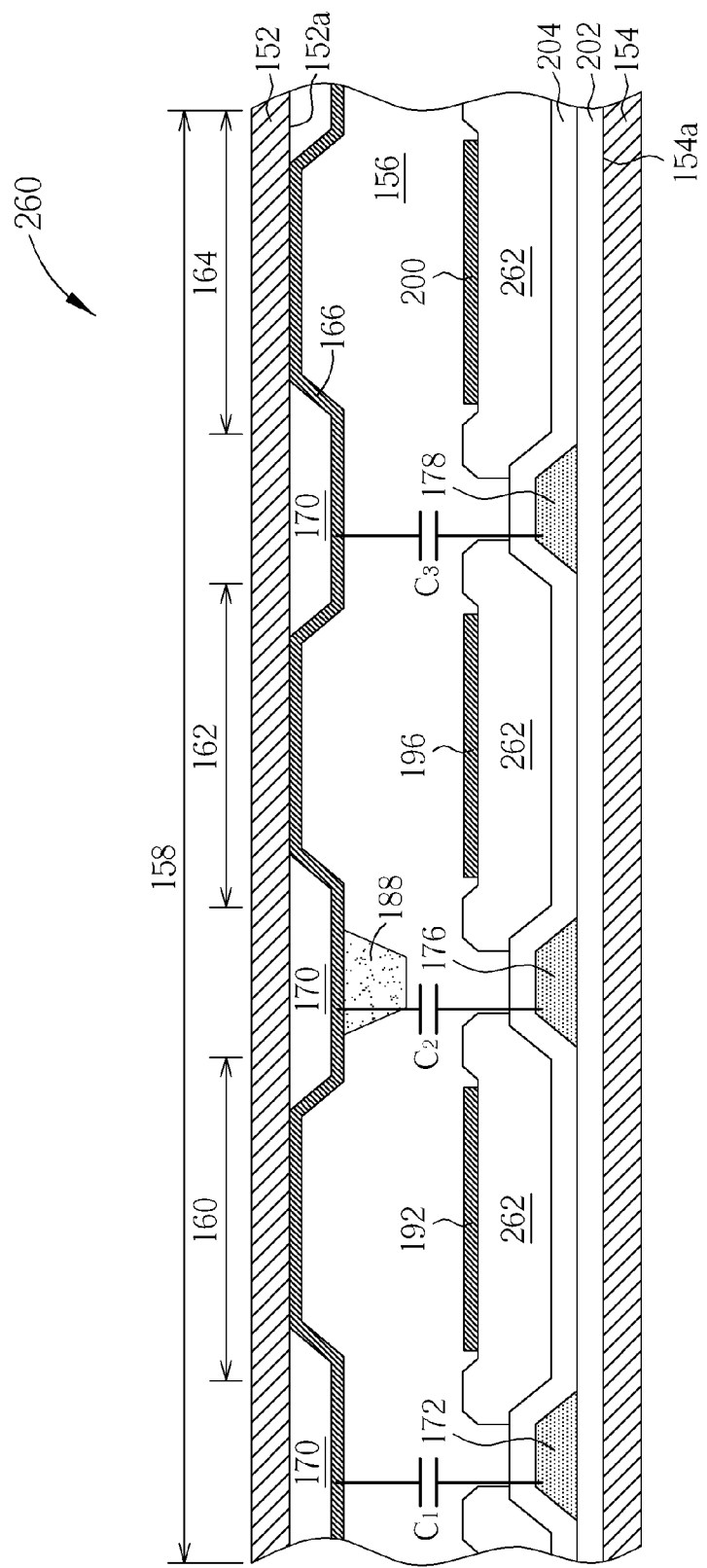
Figure 8:
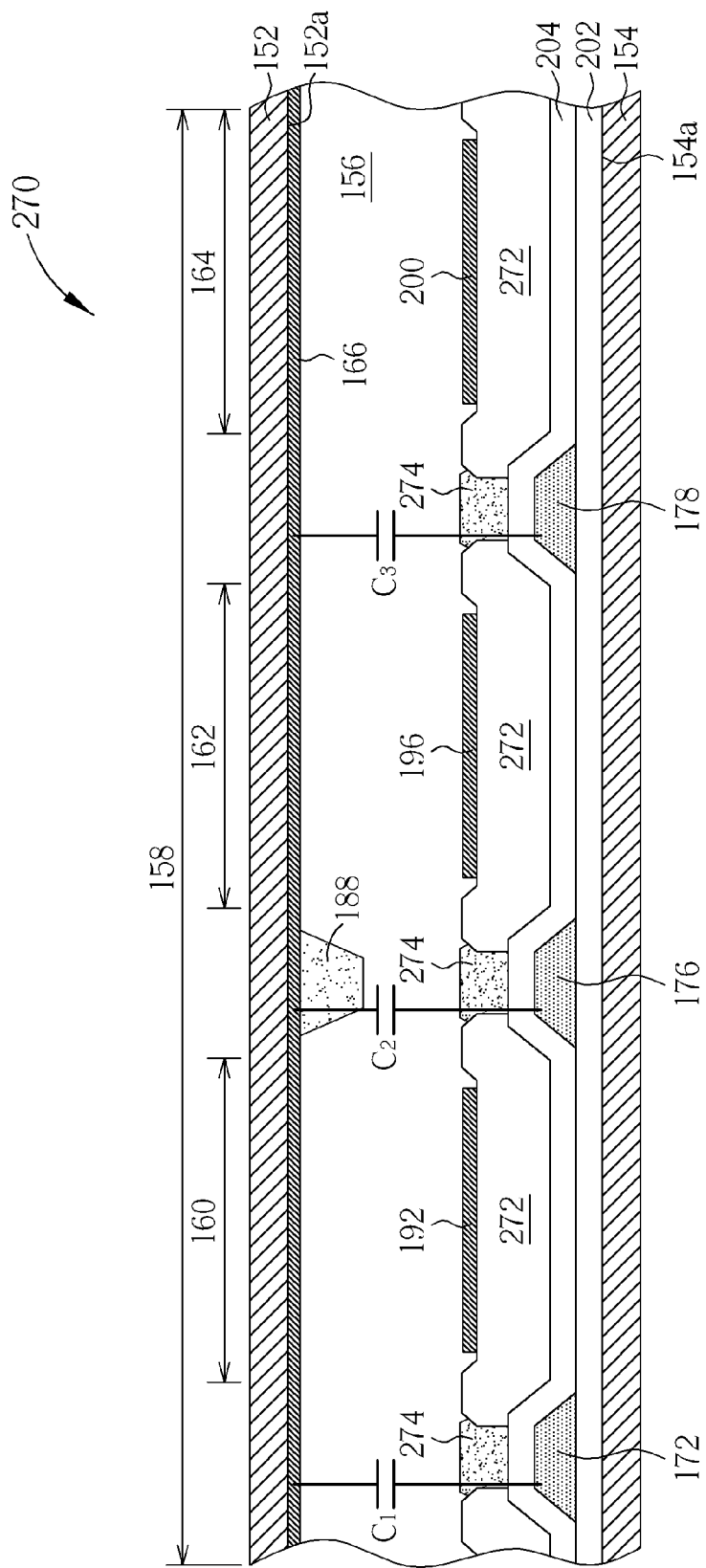

In addition, the first capacitance adjusting layer of the present invention is not limited to be disposed between the common electrode layer and the liquid crystal layer, and the color filter layers and the black matrix layer are not limited to be disposed on the first substrate. Please refer to FIG. 6 through FIG. 8. FIG. 6 through FIG. 8 are schematic diagrams illustrating cross-sectional views of liquid crystal display panels along the cutting line AA' shown in FIG. 4 according to a second preferred embodiment to a fourth preferred embodiment of the present invention. The same numerals denote the same components in the following description, and the same parts are not detailed redundantly. As shown in FIG. 6, a first capacitance adjusting layer 252 of a liquid crystal display panel 250 according to the second preferred embodiment is disposed between the liquid crystal layer 156 and each of the second data lines 176 as compared with the first preferred embodiment. In other words, the first capacitance adjusting layer 252 is fabricated on the second substrate 154. As shown in FIG. 7, a color filter layer 262 of a liquid crystal display panel 260 according to the third preferred embodiment is disposed between the second substrate 154 and the liquid crystal layer 156 as compared with the first preferred embodiment. Also, a red color filter layer is disposed between the first sub-pixel electrode 192 and the passivation layer 204, a green color filter layer is disposed between the second sub-pixel electrode 196 and the passivation layer 204, and a blue color filter layer is disposed between the third sub-pixel electrode 200 and the passivation layer 204. In other words, the color filter layer 262 is fabricated on the second substrate 154. Furthermore, the first capacitance adjusting layer 188 is disposed between the liquid crystal layer 156 and the common electrode layer 166, but not limited in the present invention. The first capacitance adjusting layer of the present invention also can be disposed between the liquid crystal layer and the second data line. As shown in FIG. 8, a color filter layer 272 and a black matrix layer 274 of a liquid crystal display panel 270 according to the fourth preferred embodiment are disposed between the liquid crystal layer 156 and the passivation layer 204, and the common electrode layer 166 is directly in contact with the second substrate 154 as compared with the first preferred embodiment. In other words, the color filter layer 272 and the black matrix layer 274 are fabricated on the second substrate 154. Additionally, the first capacitance adjusting layer 188 of the embodiment is disposed between the liquid crystal layer 156 and the common electrode layer 166, but not limited in the present invention. The first capacitance adjusting layer of the present invention also can be disposed between the liquid crystal layer and the second data line.

Figure 9:
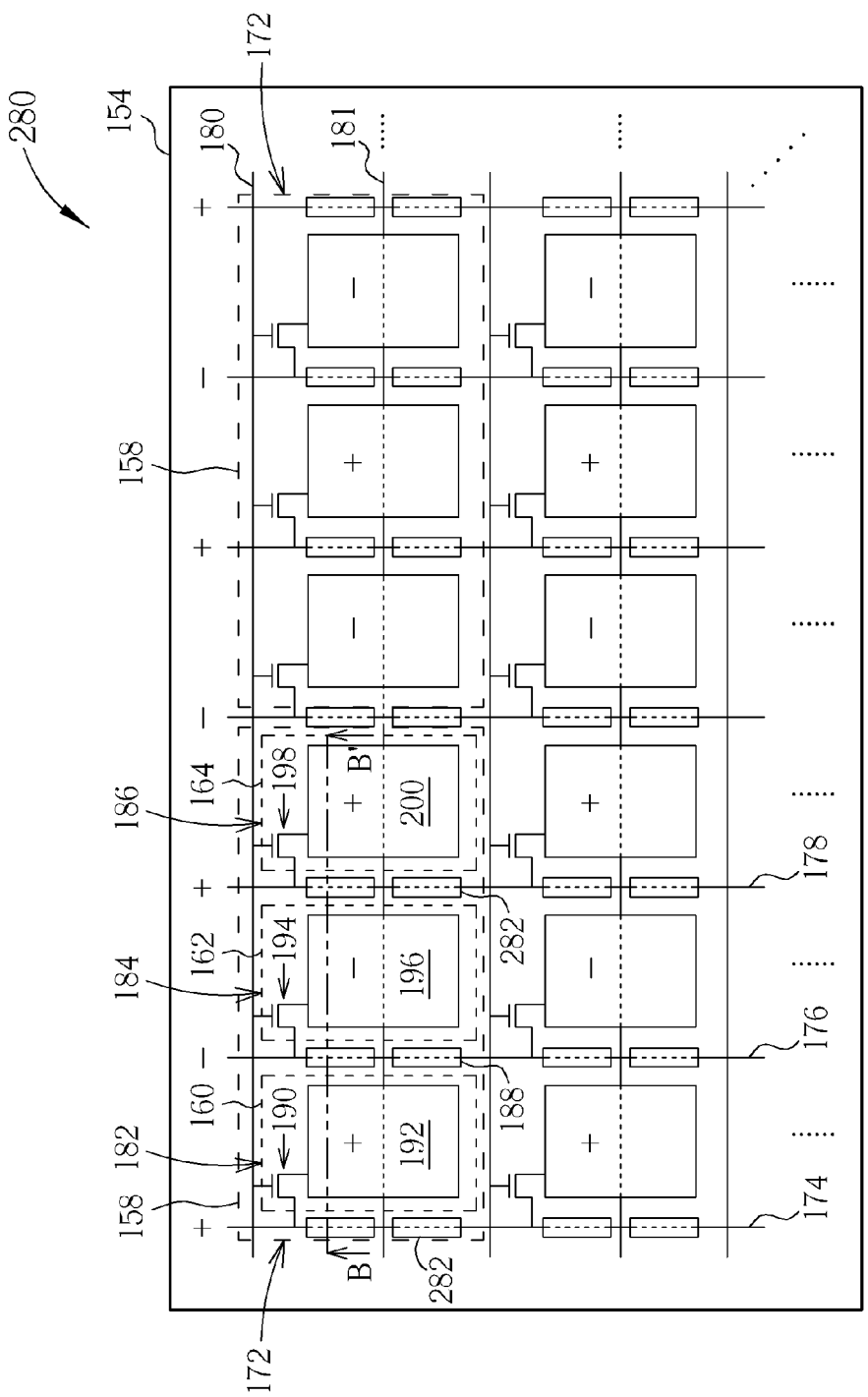
FIG. 9 is a schematic diagram illustrating a top view of a liquid crystal display panel according to a fifth preferred embodiment of the present invention.
Figure 10:
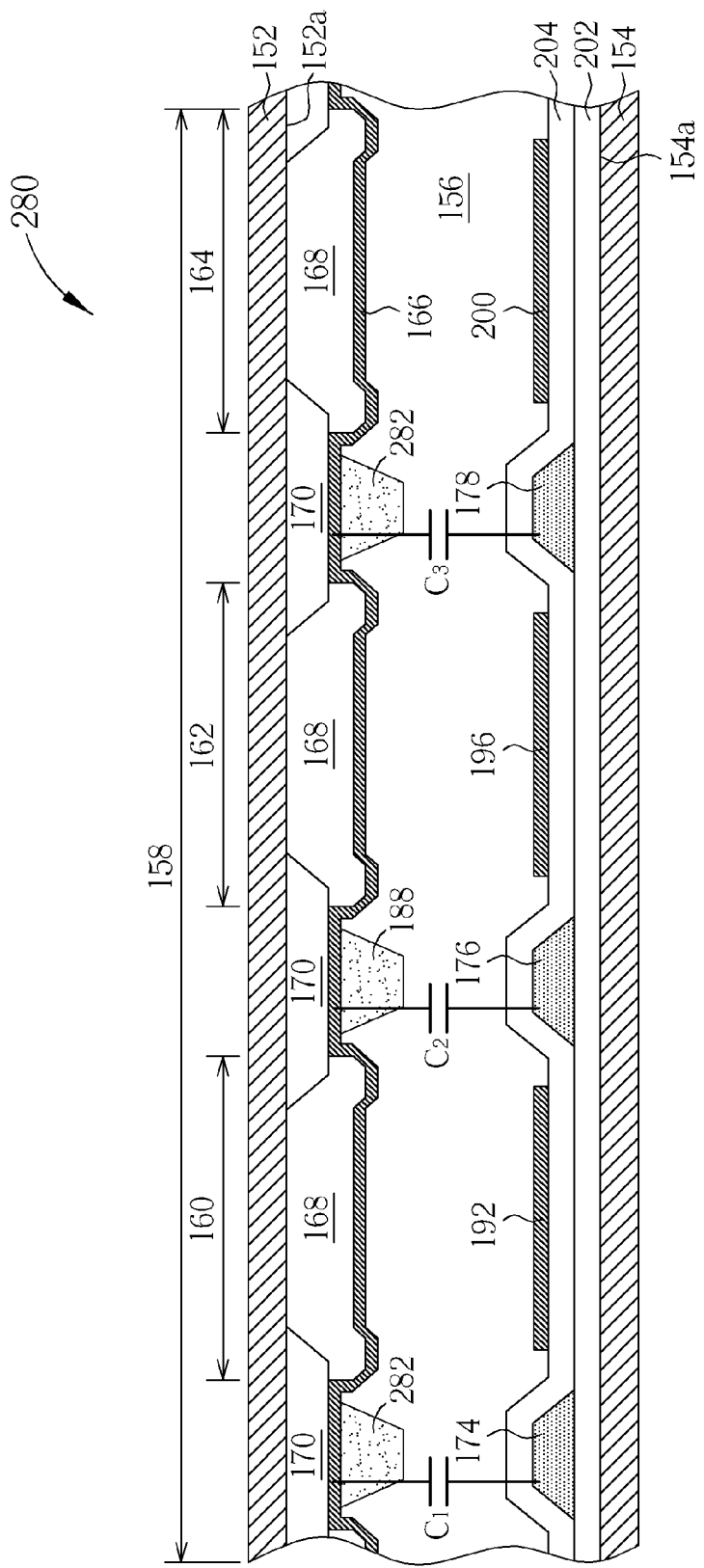
FIG. 10 is a schematic diagram illustrating a cross-sectional view of the liquid crystal display panel along the cutting line BB' shown in FIG. 9 according to the fifth preferred embodiment.

In other preferred embodiments of the present invention, at least a capacitance adjusting layer can be disposed between the first data line and the common electrode layer, and at least a capacitance adjusting layer can be disposed between the third data line and the common electrode layer. Please refer to FIG. 9 and FIG. 10. FIG. 9 is a schematic diagram illustrating a top view of a liquid crystal display panel according to a fifth preferred embodiment of the present invention, and FIG. 10 is a schematic diagram illustrating a cross-sectional view of the liquid crystal display panel along the cutting line BB' shown in FIG. 9 according to the fifth preferred embodiment. As shown in FIG. 9 and FIG. 10, compared with the first preferred embodiment, each of the pixel structures 172 of the liquid crystal display panel 280 in this embodiment further includes at least two second capacitance adjusting layers 282, disposed between the common electrode layer 166 and the liquid crystal layer 156, and the second capacitance adjusting layers 282 respectively correspond to the first data line 174 and the third data line 178 to adjust the capacitances of the first coupling capacitor C1 and the third coupling capacitor C3. The second capacitance adjusting layers 282 of the present invention can be composed of a material with a dielectric constant smaller than the first dielectric constant, such as photo-resist materials having the dielectric constant substantially between 3.2 and 3.3 used for forming photo spacers or bumps, or other organic dielectric materials, but no limited thereto. It is noted in accordance with this embodiment that each of the second capacitance adjusting layers 282 has a third dielectric constant, and the third dielectric constant is smaller than the first dielectric constant. Also, the third dielectric constant is smaller than the second dielectric constant. Thus, the capacitances of the first coupling capacitor C1 and the third coupling capacitor C3 are smaller than the capacitance of the second coupling capacitor C2. As we can see from the above-mentioned, the first capacitance adjusting layer 188 is utilized to adjust the capacitance of the second coupling capacitor C2 in accordance with this embodiment, and the second capacitance adjusting layers 282 disposed between the common electrode layer 166 and the first data line 174 and between the common electrode layer 166 and the third data line 178 respectively are utilized to adjust the capacitances of the first coupling capacitor C1 and the third coupling capacitor C3. As a result, the data signals with the second polarity can induce a higher coupling effect to the common voltage of the common electrode layer 166 as compared with the data signals with the first polarity. Thus, the deviations of the common voltage respectively shifting toward the first polarity and the second polarity of the common electrode layer 166 can be substantially the same. Therefore, the net common voltage does not affected by the data signals to shift, and the greenish problem of frames can be solved.

Moreover, the second capacitance adjusting layer of the present invention is not limited to be disposed between the common electrode layer and the liquid crystal layer, and the color filter layer and the black matrix layer are not limited to be disposed on the first substrate. In other embodiments of the present invention, the second capacitance adjusting layers can be disposed between the liquid crystal layer and the first data line and between the liquid crystal layer and the third data line. Also, the color filter layer can be disposed between the second substrate and the liquid crystal layer. Or, the color filter layer and the black matrix layer can be disposed between the liquid crystal layer and the passivation layer, and the common electrode layer is directly in contact with the second substrate.

Figure 11:
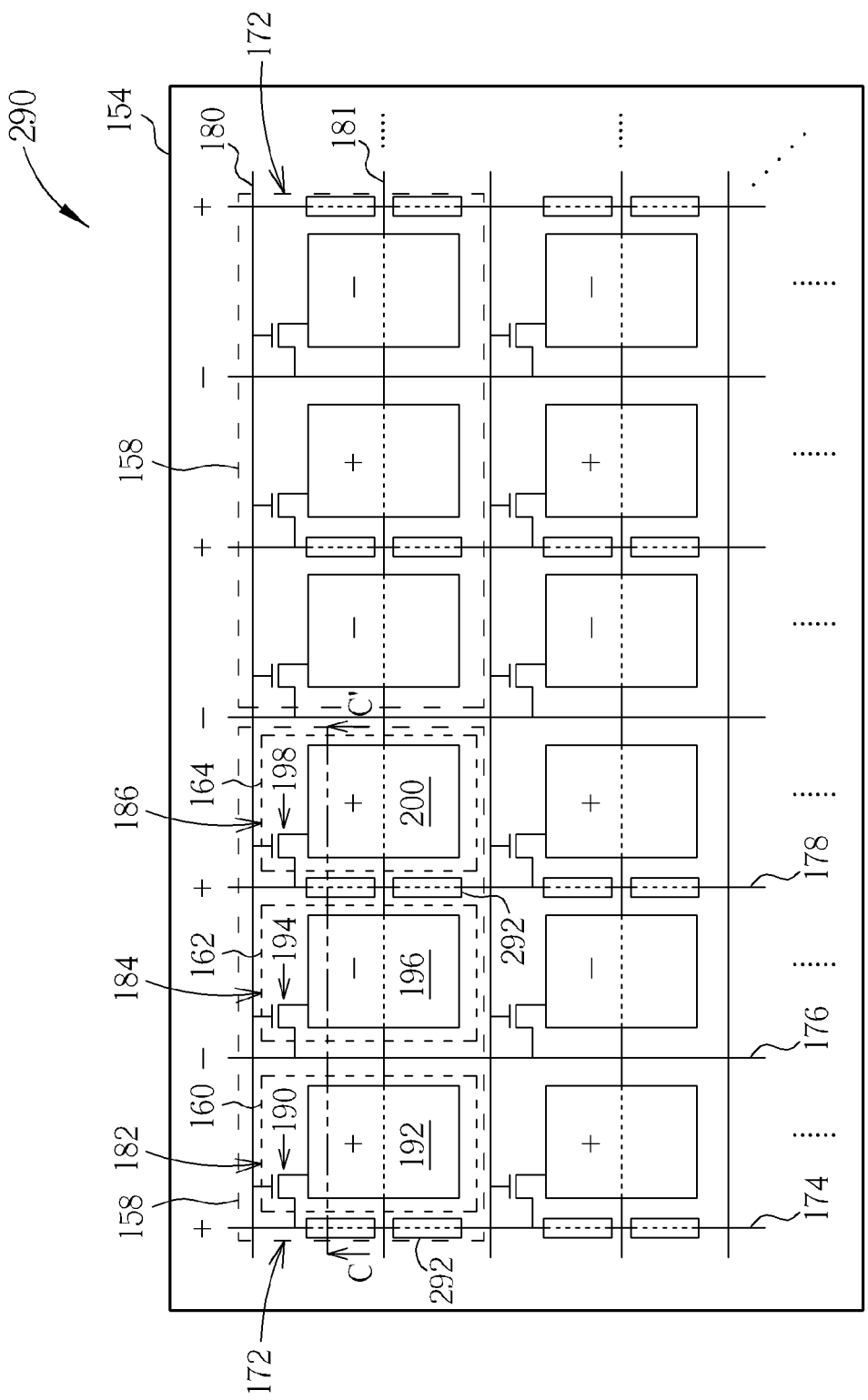
FIG. 11 is a schematic diagram illustrating a top view of a liquid crystal display panel according to a sixth preferred embodiment of the present invention.
Figure 12:
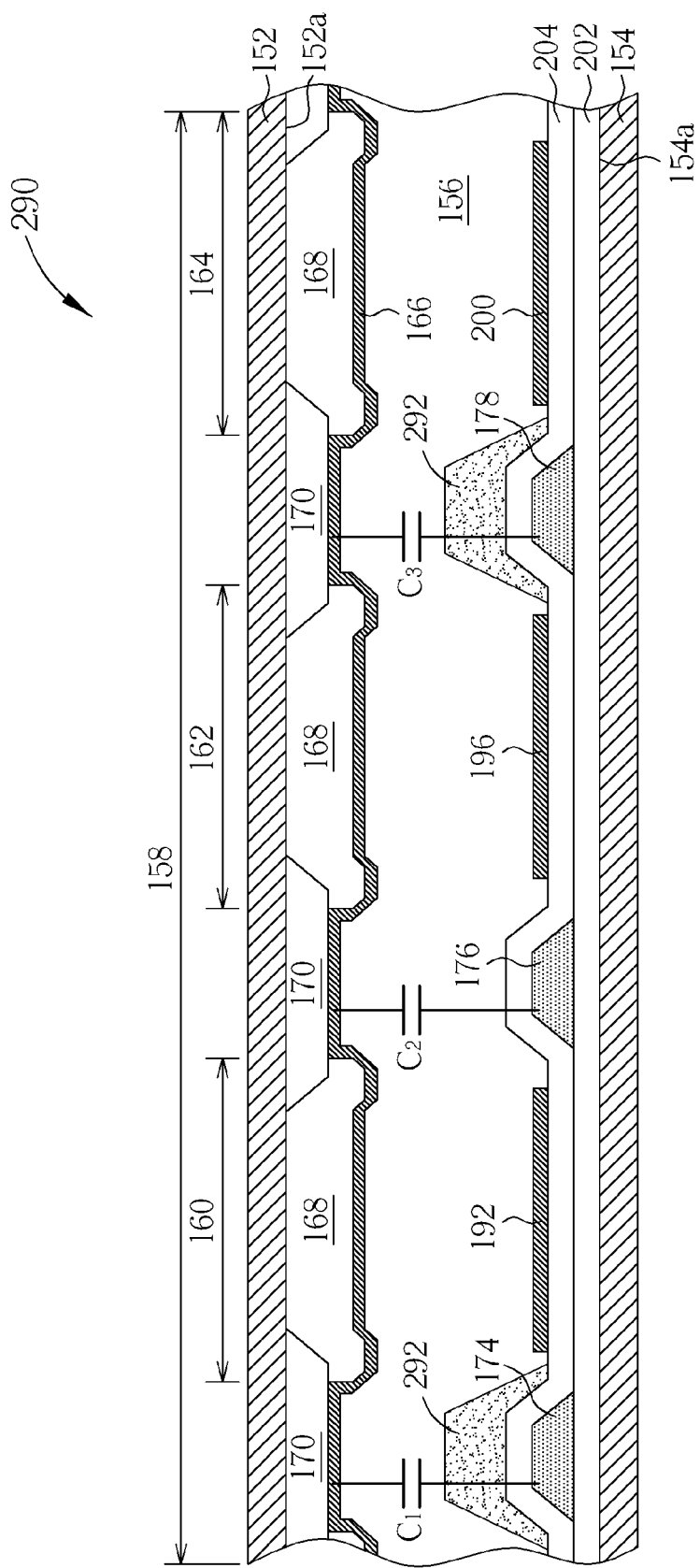
FIG. 12 is a schematic diagram illustrating a cross-sectional view of the liquid crystal display panel along a section line CC' shown in FIG. 11 according to the sixth preferred embodiment.

Please refer to FIG. 11 and FIG. 12. FIG. 11 is a schematic diagram illustrating a top view of a liquid crystal display panel according to a sixth preferred embodiment of the present invention, and FIG. 12 is a schematic diagram illustrating a cross-sectional view of the liquid crystal display panel along a section line CC' shown in FIG. 11 according to the sixth preferred embodiment. The same numerals denote the same components in the following description, and the same parts are not detailed redundantly. As shown in FIG. 11 and FIG. 12, as compared with the fifth preferred embodiment, each of the pixel structures 172 of the liquid crystal display panel 290 according to this embodiment only includes the second capacitance adjusting layers 292, and the first capacitance adjusting layer 188 is not included in this embodiment as compared with the fifth preferred embodiment. Each of the second adjusting layers 292 is respectively disposed between the liquid crystal layer 156 and the first data line 174 and between the liquid crystal layer 156 and the third data line 178. Therefore, the liquid crystal layer 156, the passivation layer 204 and the second capacitance adjusting layers 292 constitute the dielectric layers of the first coupling capacitor C1 and the third coupling capacitor C3. Moreover, no capacitance adjusting layer is disposed between the second data line 176 and the common electrode layer 166, and thus the dielectric layer of the second coupling capacitor C2 is only composed of the liquid crystal layer 156 and the passivation layer 204. As we can see from the above-mentioned, the third dielectric constant of each of the second adjusting layers 292 is smaller than the first dielectric constant of the liquid crystal layer 156, and thus, the capacitances of the first coupling capacitor C1 and the third coupling capacitor C3 are smaller than the capacitance of the second coupling capacitor C2. Therefore, the data signals with the first polarity can induce a lower coupling effect to the common voltage of the common electrode layer 166 as compared with the data signals with the second polarity. Consequently, the deviations of the common voltages respectively shifting toward the first polarity and the second polarity can be substantially the same. As a result, the common voltage does not affected by the data signals to shift, and thus, the greenish problem of frames can be solved.

Figure 13:
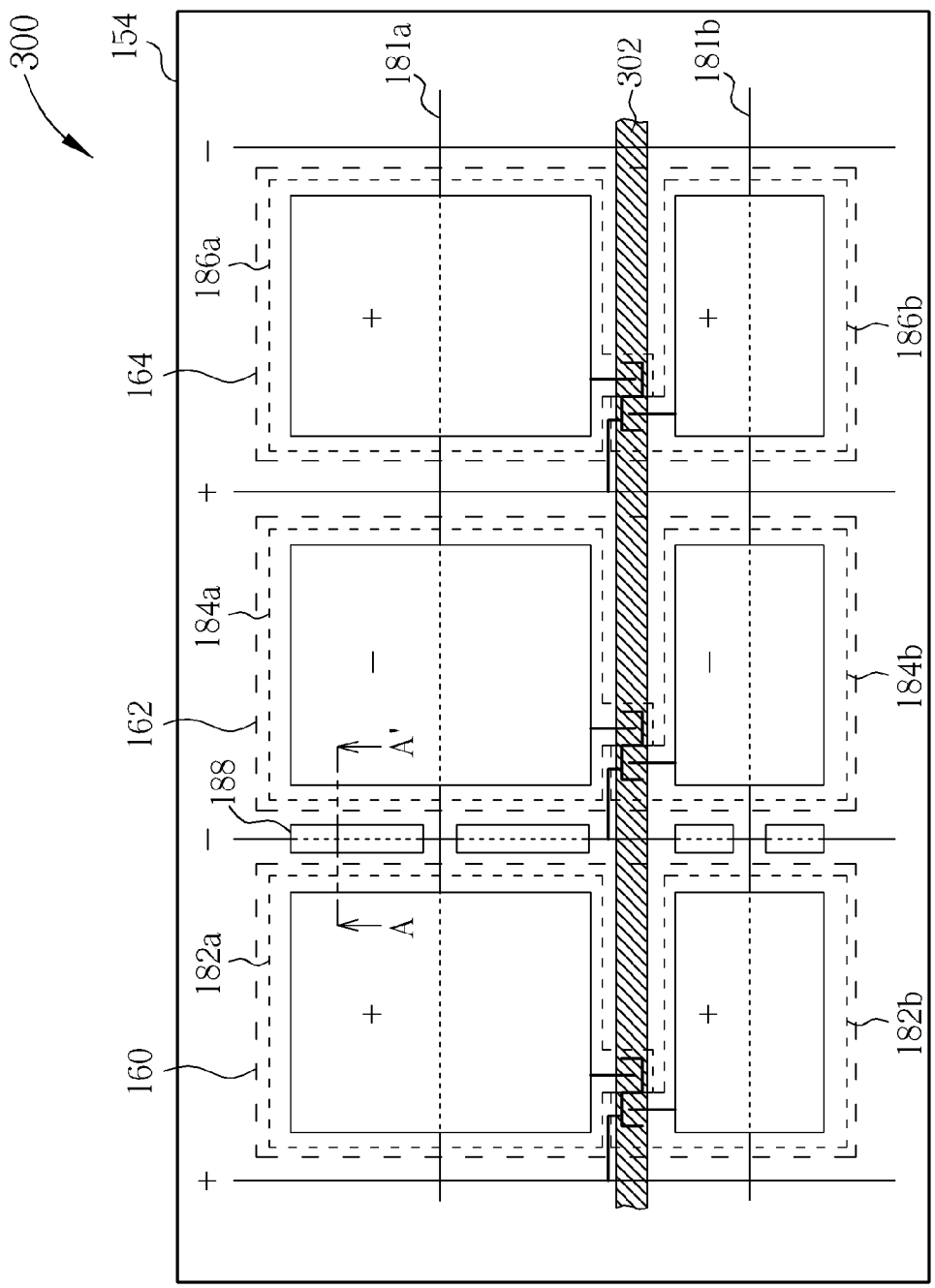
FIG. 13 is a schematic diagram illustrating a top view of a liquid crystal display panel according to a seventh preferred embodiment of the present invention.

Furthermore, the pixel structures of the present invention are not limited to the previously mentioned structure, and can be other pixel structures with different functions. For example, a pixel structure having two pixel electrodes in a single sub-pixel area can be adopted to solve color washout problem and frame flicker problem when a liquid crystal display panel is watched at a large viewing angle. Please refer to FIG. 13, which schematically illustrates a top view of a liquid crystal display panel according to a seventh preferred embodiment of the present invention. As shown in FIG. 13, as compared with the first preferred embodiment, a scan line 302 of the liquid crystal display panel 300 in this embodiment is disposed on the second substrate 154 and located across the first sub-pixel area 160, the second sub-pixel area 162, and the third sub-pixel area 164, and the first sub-pixel 182 includes a first upper sub-pixel 182a and a first lower sub-pixel 182b. The second sub-pixel 184 includes a second upper sub-pixel 184a and a second lower sub-pixel 184b, and the third sub-pixel 186 includes a third upper sub-pixel 186a and a third lower sub-pixel 186b. The first upper sub-pixel 182a, the second upper sub-pixel 184a and the third upper sub-pixel 186a are disposed at a side of the scan line 302, and the first lower sub-pixel 182b, the second lower sub-pixel 184b and the third lower sub-pixel 186a are disposed at the other side of the scan line 302. The common line 181 of this embodiment includes a first common line 181a and a second common line 181b. The first common line 181a is located across the first upper sub-pixel 182a, the second upper sub-pixel 184a, and the third upper sub-pixel 186a, and the second common line 181b is located across the first lower sub-pixel 182b, the second lower sub-pixel 184b, and the third lower sub-pixel 186b. Additionally, the capacitance adjusting layer 188 is disposed between the first upper sub-pixel 182a and the second upper sub-pixel 184a and between the first lower sub-pixel 182b and the second lower sub-pixel 184b, but not overlap to the first common line 181a, the first common line 181b and the scan line 302.

To sum up, the present invention disposes the first capacitance adjusting layer between the common electrode layer and the second data line and the second capacitance adjusting layers respectively between the common electrode layer and the first data line and between the common electrode layer and the third data line, and thus the data signals with the second polarity induce a higher coupling effect to the common voltage of the common electrode layer as compared with the data signals with the first polarity. For this reason, the deviations of the common voltage of the common electrode layer respectively shifting toward the first polarity and the second polarity of the common electrode layer 166 are substantially the same. Since the first polarity is opposite to the second polarity, the deviations of the common voltages respectively shifting toward the first polarity and the second polarity can be canceled out. Therefore, the common voltage can not affected by the data signals to shift, and the greenish problem of frames can be consequently solved.

Those skilled in the art will readily observe that numerous modifications and alterations of the device and method may be made while retaining the teachings of the invention.

What is claimed is:

1. A liquid crystal display panel, having a plurality of pixel areas, and each of the pixel areas comprising a first sub-pixel area, a second sub-pixel area and a third sub-pixel area, wherein the second sub-pixel area is disposed between the first sub-pixel area and the third sub-pixel area, the liquid crystal display panel comprising:
    a first substrate;
    a second substrate, disposed opposite to the first substrate;
    a liquid crystal layer, disposed between the first substrate and the second substrate, and the liquid crystal layer having a first dielectric constant;
    a common electrode layer, disposed between the first substrate and the liquid crystal layer; and
    a plurality of pixel structures, respectively disposed in the pixel areas, and each of the pixel structures comprising:
        a first data line, a second data line, and a third data line, disposed between the second substrate and the liquid crystal layer and respectively located at a side of the first sub-pixel area, the second sub-pixel area and the third sub-pixel area;
        at least a first sub-pixel, disposed on the second substrate in the first sub-pixel area, and the first sub-pixel and the first data line being electrically connected to each other;
        at least a second sub-pixel, disposed on the second substrate in the second sub-pixel area, and the second sub-pixel and the second data line being electrically connected to each other;
        at least a third sub-pixel, disposed on the second substrate in the third sub-pixel area, and the third sub-pixel and the third data line being electrically connected to each other; and
        at least a first capacitance adjusting layer, disposed between the common electrode layer and the second data line, and the first capacitance adjusting layer having a second dielectric constant, wherein the first capacitance adjusting layer overlap the second data line in a direction perpendicular to the first substrate, the first capacitance adjusting layer does not overlap the first data line and the third data line in the direction, and the second dielectric constant is larger than the first dielectric constant.

2. The liquid crystal display panel according to claim 1, wherein the first capacitance adjusting layer of each of the pixel structures is disposed between the liquid crystal layer and each of the second data lines.

3. The liquid crystal display panel according to claim 1, wherein the first capacitance adjusting layer of each of the pixel structures is disposed between the liquid crystal layer and the common electrode layer.

4. The liquid crystal display panel according to claim 1, wherein each of the pixel structures further comprises at least two second capacitance adjusting layers, respectively disposed between the common electrode layer and the first data line and disposed between the common electrode layer and the third data line, and each of the second capacitance adjusting layers having a third dielectric constant, wherein the third dielectric constant is smaller than the first dielectric constant.

5. The liquid crystal display panel according to claim 4, wherein the second capacitance adjusting layer of each of the pixel structures is respectively disposed between the liquid crystal layer and the first data line and between the liquid crystal layer and the third data line.

6. The liquid crystal display panel according to claim 4, wherein the second capacitance adjusting layer of each of the pixel structures is respectively disposed between the liquid crystal layer and the common electrode layer.

7. The liquid crystal display panel according to claim 1, wherein each of the first sub-pixel and the third sub-pixel has a first polarity, and the second sub-pixel has a second polarity opposite to the first polarity.

8. The liquid crystal display panel according to claim 1, wherein each of the pixel structures further comprises:
    a scan line, disposed on the second substrate and located across the first sub-pixel area, the second sub-pixel area and the third sub-pixel area and electrically connected to the first sub-pixel, the second sub-pixel and the third sub-pixel.

9. The liquid crystal display panel according to claim 1, wherein the first sub-pixel comprises a first upper sub-pixel and a first lower sub-pixel, the second sub-pixel comprises a second upper sub-pixel and a second lower sub-pixel, the third sub-pixel comprises a third upper sub-pixel and a third lower sub-pixel.

10. The liquid crystal display panel according to claim 1, further comprising a plurality of color filter layers and a black matrix layer disposed between the color filter layers, wherein the color filter layers are respectively disposed in each of the first sub-pixel areas, each of the second sub-pixel areas, and each of the third sub-pixel areas, and the color filter layers and the black matrix layer are disposed between the first substrate and the common electrode layer.

11. The liquid crystal display panel according to claim 1, further comprising a plurality of color filter layers, respectively disposed in each of the first sub-pixel areas, each of the second sub-pixel areas and each of the third sub-pixel areas and disposed between the second substrate and the liquid crystal layer.

12. The liquid crystal display panel according to claim 11, further comprising a black matrix layer, disposed between the color filter layers and disposed between the each of second data lines and the liquid crystal layer.

13. The liquid crystal display panel according to claim 11, further comprising a black matrix layer, disposed correspondingly to the second data lines and disposed between the first substrate and the common electrode layer.

14. The liquid crystal display panel according to claim 1, wherein a first coupling capacitor is coupled between the common electrode layer and the first data line, and a second coupling capacitor is coupled between the common electrode layer and the second data line, wherein a capacitance of the second coupling capacitor is larger than a capacitance of the first coupling capacitor.

15. The liquid crystal display panel according to claim 1, wherein the first sub-pixel area comprises a red sub-pixel area, the second sub-pixel area comprises a green sub-pixel area, and the third sub-pixel area comprises a blue sub-pixel area.

16. An liquid crystal display panel, having a plurality of pixel areas, and each of the pixel areas comprising a first sub-pixel area, a second sub-pixel area, and a third sub-pixel area, wherein the second sub-pixel area is disposed between the first sub-pixel area and the third sub-pixel area, the liquid crystal display panel comprising:
  a first substrate;
  a second substrate, disposed opposite to the first substrate;
  a liquid crystal layer, disposed between the first substrate and the second substrate, and the liquid crystal layer having a first dielectric constant;
  a common electrode layer, disposed between the first substrate and the liquid crystal layer; and
  a plurality of pixel structures, respectively disposed in the pixel areas, each of the pixel structures comprising:
    a first data line, a second data line and a third data line, disposed between the second substrate and the liquid crystal layer and respectively located at a side of the first sub-pixel area, the second sub-pixel area and the third sub-pixel area;
    at least a first sub-pixel, disposed on the second substrate in the first sub-pixel area, and the first sub-pixel and the first data line electrically connected to each other;
    at least a second sub-pixel, disposed on the second substrate in the second sub-pixel area, and the second sub-pixel and the second data line electrically connected to each other;
    at least a third sub-pixel, disposed on the second substrate in the third sub-pixel area, and the third sub-pixel and the third data line electrically connected to each other; and
    at least two second capacitance adjusting layers, respectively disposed between the common electrode layer and first data line and disposed between the common electrode layer and third data line, and each of the second capacitance adjusting layers having a third dielectric constant, wherein the second capacitance adjusting layers overlap the first data line and the third data line respectively in a direction perpendicular to the first substrate, the second capacitance adjusting layers do not overlap the second data line in the direction, and the third dielectric constant is smaller than the first dielectric constant.

17. The liquid crystal display panel according to claim 16, wherein the second capacitance adjusting layers of each of the pixel structures are respectively disposed between the liquid crystal layer and the first data line and between the liquid crystal layer and the third data line.

18. The liquid crystal display panel according to claim 16, wherein the second capacitance adjusting layers of each of the pixel structures are disposed between the liquid crystal layer and the common electrode layer.

19. The liquid crystal display panel according to claim 16, wherein each of the pixel structures further comprises at least a first capacitance adjusting layer, disposed between the common electrode layer and the second data line, and the first capacitance adjusting layer has a second dielectric constant, wherein the second dielectric constant is larger than the first dielectric constant.

20. The liquid crystal display panel according to claim 19, wherein the first capacitance adjusting layer of each of the pixel structures is disposed between the liquid crystal layer and the second data line.

21. The liquid crystal display panel according to claim 19, wherein the first capacitance adjusting layer of each of the pixel structures is disposed between the liquid crystal layer and the common electrode layer.

22. The liquid crystal display panel according to claim 16, wherein each of the first sub-pixel and the third sub-pixel has a first polarity, and the second sub-pixel has a second polarity opposite to the first polarity.

23. The liquid crystal display panel according to claim 16, wherein each of the pixel structures further comprises:
  a scan line, disposed on the second substrate and disposed across the first sub-pixel area, the second sub-pixel area and the third sub-pixel area and electrically connected to the first sub-pixel, the second sub-pixel and the third sub-pixel.

24. The liquid crystal display panel according to claim 16, wherein at least a first sub-pixel comprises a first upper sub-pixel and a first lower sub-pixel, at least a second sub-pixel comprises a second upper sub-pixel and a second lower sub-pixel, and at least a third sub-pixel comprises a third upper sub-pixel and a third lower sub-pixel.

25. The liquid crystal display panel according to claim 16, further comprising a plurality of color filter layers and a black matrix layer disposed between the color filter layers, wherein the color filter layers are respectively disposed in each of the first sub-pixel areas, each of the second sub-pixel areas, and each of the third sub-pixel areas, and the color filter layers and the black matrix layer are disposed between the first substrate and the common electrode layer.

26. The liquid crystal display panel according to claim 16, wherein each of the pixel structures further comprises a plurality of color filter layers, respectively disposed in each of the first sub-pixel areas, each of the second sub-pixel areas, and each of the third sub-pixel areas and disposed between the second substrate and the liquid crystal layer.

27. The liquid crystal display panel according to claim 26, wherein each of the pixel structures further comprises a black matrix layer, disposed between the color filter layers and disposed between each of second data lines and the liquid crystal layer.

28. The liquid crystal display panel according to claim 26, further comprising a black matrix layer, disposed correspondingly to the second data line and disposed between the first substrate and the common electrode layer.

29. The liquid crystal display panel according to claim 16, wherein a first coupling capacitor is coupled between the common electrode layer and the first data line, and a second coupling capacitor is coupled between the common electrode layer and the second data line, wherein a capacitance of the second coupling capacitor is larger than a capacitance of the first coupling capacitor.

30. The liquid crystal display panel according to claim 16, wherein the first sub-pixel area comprises a red sub-pixel area, the second sub-pixel area comprises a green sub-pixel area, and the third sub-pixel area comprises a blue sub-pixel area.

* * * * *